United States Patent
Hashemzadeh et al.

(10) Patent No.: US 7,723,424 B2
(45) Date of Patent: May 25, 2010

(54) SILANE-MODIFIED POLYVINYL ALCOHOLS

(75) Inventors: Abdulmajid Hashemzadeh, Burgkirchen (DE); Karl Ernst Fickert, Altoetting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/093,505

(22) PCT Filed: Nov. 14, 2006

(86) PCT No.: PCT/EP2006/068422

§ 371 (c)(1),
(2), (4) Date: May 13, 2008

(87) PCT Pub. No.: WO2007/057382

PCT Pub. Date: May 24, 2007

(65) Prior Publication Data

US 2008/0281035 A1    Nov. 13, 2008

(30) Foreign Application Priority Data

Nov. 17, 2005 (DE) .................. 10 2005 054 913

(51) Int. Cl.
*C08L 29/04* (2006.01)
*C08L 43/00* (2006.01)

(52) U.S. Cl. .................. 524/503; 524/535; 524/557; 525/59; 525/61

(58) Field of Classification Search .................. 524/557, 524/503, 535; 525/59, 61; 523/107; 424/70.12, 424/70.122

See application file for complete search history.

(56) References Cited

U.S. PATENT DOCUMENTS

| | | | |
|---|---|---|---|
| 4,583,103 A | | 4/1986 | Hayashi et al. |
| 4,617,239 A | * | 10/1986 | Maruyama et al. .......... 428/452 |
| 4,883,344 A | * | 11/1989 | Okada et al. ................ 349/135 |
| 5,036,137 A | | 7/1991 | Sau |
| 7,052,773 B2 | * | 5/2006 | Bacher et al. .............. 428/514 |
| 2006/0052530 A1 | | 3/2006 | Bacher et al. |
| 2006/0074187 A1 | | 4/2006 | Stark et al. |

FOREIGN PATENT DOCUMENTS

| | | |
|---|---|---|
| DE | 3519575 C2 | 12/1985 |
| EP | 0076490 A1 | 4/1983 |
| EP | 0187040 A2 | 7/1986 |
| EP | 1080940 A2 | 3/2001 |
| EP | 1127706 A1 | 8/2001 |
| EP | 1380599 A1 | 1/2004 |
| EP | 1380600 A1 | 1/2004 |
| JP | 5247882 A | 9/1993 |
| WO | WO 2004013190 A1 | 2/2004 |
| WO | WO 2004065437 A1 | 8/2004 |

OTHER PUBLICATIONS

Elvanol polyvinyl alcohol Technical Information Grade Chart, May 2003, pp. 1 & 2, Copyright 2003, E.I. Dupont Nemours & Company, Inc.*
Vinyltrichlorosilane Cameo Chemicals Data Sheet; National Oceanic and atmospheric Administration.*
Patent Abstract Corresponding to JP 5-247882, Sep. 24, 1993.

* cited by examiner

*Primary Examiner*—David Wu
*Assistant Examiner*—Marie Reddick
(74) *Attorney, Agent, or Firm*—Brooks Kushman P.C.

(57) ABSTRACT

Silane-modified polyvinyl alcohols are obtained by treating vinyl alcohol polymers with one or more ethylenically unsaturated, silane-containing monomers at elevated temperature.

8 Claims, No Drawings

SILANE-MODIFIED POLYVINYL ALCOHOLS

CROSS-REFERENCE TO RELATED APPLICATION

This application is the U.S. national phase of PCT Appln. No. PCT/EP2006/068422 filed Nov. 14, 2006 which claims priority to German application DE 10 2005 054 913.6 filed Nov. 17, 2005.

BACKGROUND OF THE INVENTION

1. Field of the Invention

The invention relates to silane-modified polyvinyl alcohols, to a novel process for preparing silane-modified polyvinyl alcohols and to their use.

2. Description of the Related Art

Polyvinyl alcohol and polyvinyl alcohol copolymers find various uses as binders, as protective colloids in emulsion and suspension polymerization, as cobinders in paper coatings and as an oxygen barrier in the packaging industry. The modification of polyvinyl alcohol with silane groups provides higher strengths and better attachment to mineral substances such as pigments, fillers and glass.

Silane-modified polyvinyl alcohols have been prepared to date by means of copolymerization of vinyl acetate and ethylenically unsaturated silane and subsequent hydrolysis, or by subsequent silylation of the vinyl alcohol units of polyvinyl alcohol with a silylating agent having at least two hydrolysable groups. EP 0076490 A1 describes a paper coating composition based on silanized polyvinyl alcohols which are obtainable by means of the two process variants mentioned. EP 1127706 A1 relates to inkjet recording materials which have a coating comprising silane-functional polyvinyl alcohol, the silanized polyvinyl alcohols used there likewise being obtainable by these two process variants mentioned. DE 3519575 C2, which relates to heat-sensitive recording materials having a protective layer, also mentions the alternatives of silylating the vinyl alcohol units or copolymerizing vinyl acetate with ethylenically unsaturated silane and subsequently hydrolysing as suitable preparation processes.

The silanized polyvinyl alcohols from EP 1380599 A1 and EP 1380600 are obtained by means of copolymerization of vinyl esters and ethylenically unsaturated silanes and subsequent hydrolysis of the silanized polyvinyl esters, and it is optionally possible to polymerize in the presence of mercapto compounds. EP 1080940 A2 describes three alternatives for the preparation of silanized polyvinyl alcohols: vinyl esters are copolymerized with olefinically unsaturated monomers having a silyl group and then hydrolysed. Vinyl ester is copolymerized with epoxy-functional comonomers, and the copolymer obtained thereby is reacted with a compound which contains both mercapto and silyl groups, and is then hydrolysed. Vinyl ester is copolymerized with mercapto and silyl groups in the presence of a compound and then hydrolysed. WO 2004/013190 A1 describes the preparation of silane-modified polyvinyl alcohols, vinyl esters being polymerized in the presence of silane-containing aldehydes, and the vinyl ester polymer obtained thereby subsequently being hydrolysed.

The processes mentioned are all relatively complicated, and, in addition, with increasing silane concentrations, gel can be formed during the synthesis and water-insoluble products can be formed owing to the side reactions of the hydroxyl groups with aldehyde.

SUMMARY OF THE INVENTION

It is an object of the invention to provide silane-modified polyvinyl alcohols by a simpler route, by which products with good solubilitiy and storage stability should result even at high silane concentrations. These and other objects are obtained by treating vinyl alcohol polymers with unsaturated silane-containing monomers at elevated temperatures.

The invention thus provides silane-modified polyvinyl alcohols obtainable by treating vinyl alcohol polymers with one or more ethylenically unsaturated, silane-containing monomers at elevated temperature.

Suitable vinyl alcohol polymers are partly or fully hydrolysed vinyl ester polymers preferably having a degree of hydrolysis of 50 mol % to 99.99 mol %, more preferably 70 mol % to 99 mol %, and most preferably of >96 mol %. In this context, fully hydrolysed refers to those polymers having a degree of hydrolysis of >96 mol%. Partly hydrolysed vinyl ester polymers are those having a degree of hydrolysis of >50 mol % and <96 mol %. The viscosity of the vinyl alcohol polymer (DIN 53015, Höppler method; 4% solution in water) is 1 to 60 mPas, preferably 1 to 10 mPas, and serves as a measure of the molecular weight and of the degree of polymerization of the partly or fully hydrolysed polyvinyl alcohols.

Suitable vinyl alcohol polymers are commercially available polyvinyl alcohols or can be prepared by means of polymerization of vinyl esters and subsequent hydrolysis.

Vinyl esters suitable for preparing the vinyl alcohol polymers are vinyl esters of unbranched or branched carboxylic acids having 1 to 18 carbon atoms. Preferred vinyl esters are vinyl acetate, vinyl propionate, vinyl butyrate, vinyl 2-ethyihexanoate, vinyl laurate, 1-methylvinyl acetate, vinyl pivalate and vinyl esters of a-branched monocarboxylic acids having 5 to 13 carbon atoms, for example VeoVa9$^R$ or VeoVa10$^R$ (tradename of Resolution Performance Products). Particular preference is given to vinyl acetate.

In addition to the vinyl ester units, it is optionally also possible to copolymerize one or more monomers from the group comprising methacrylic esters and acrylic esters of alcohols having 1 to 15 carbon atoms, olefins, dienes, vinylaromatics and vinyl halides. Suitable monomers from the group of the esters of acrylic acid or methacrylic acid are esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-, iso- and t-butyl acrylate, n-, iso- and t-butyl methacrylate, 2-ethylhexyl acrylate, norbornyl acrylate. Particular preference is given to methyl acrylate, methyl methacrylate, n-, iso- and t-butyl acrylate, 2-ethylhexyl acrylate and norbornyl acrylate. Suitable dienes are 1,3-butadiene and isoprene. Examples of polymerizable olefins are ethene and propene. The vinylaromatics copolymerized may be styrene and vinyltoluene. From the group of the vinyl halides, it is customary to use vinyl chloride, vinylidene chloride or vinyl fluoride, preferably vinyl chloride. The proportion of these comonomers is such that the proportion of vinyl ester monomer is >50 mol % in the vinyl ester polymer.

Optionally, it is also possible for further comonomers, preferably in a proportion of 0.02 to 20% by weight, based on the total weight of the vinyl ester polymer, to be present. Examples of these are ethylenically unsaturated mono and dicarboxylic acids, preferably acrylic acid, methacrylic acid, fumaric acid and maleic acid; ethylenically unsaturated carboxamides and carbonitriles, preferably N vinylformamide, acrylamide and acrylonitrile; mono and diesters of fumaric acid and maleic acid, such as the diethyl and diisopropyl esters, and maleic anhydride, ethylenically unsaturated sulphonic acids and salts thereof, preferably vinylsulphonic acid, and 2-acrylamido-2-methylpropanesulphonic acid. Further examples are precrosslinking comonomers such as polyethylenically unsaturated comonomers, for example divinyl adipate, diallyl maleate, allyl methacrylate, butanediol diacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide, N-methylolallyl carbamate, alkyl ethers such as the isobutoxy ether, or esters, of N-methylolacrylamide, of N-methylolmethacrylamide and of N-methylolallyl carbamate.

The vinyl ester polymers can be prepared in a known manner by means of polymerization; preferably by bulk polymerization, suspension polymerization or by polymerization in organic solvents, more preferably in alcoholic solution. Suitable solvents and regulators are, for example, methanol, ethanol, propanol and isopropanol. The polymerization is performed under reflux at a temperature of 50° C. to 100° C. and initiated via a free-radical mechanism by adding customary initiators. Examples of common initiators are percarbonates such as cyclohexyl peroxodicarbonate, or peresters such as t-butyl perneodecanoate or t-butyl perpivalate.

The molecular weight can be adjusted in a known manner by virtue of the solvent content, by variation of the initiator concentration, by variation of the temperature and by addition of regulators. The monomers can all be initially charged together or all metered in together, or portions can be initially charged and the remainder metered in after the initiation of the polymerization. The metered additions can be carried out separately (spatially and in terms of time), or some or all of the components to be metered in can be metered in preemulsified form.

The hydrolysis of the vinyl ester polymers to polyvinyl alcohols can be effected in a manner known per se, for example by the belt or kneader process, under alkaline or acidic conditions with addition of acid or base. The solid polyvinyl ester resin is preferably taken up in alcohol, for example methanol, while establishing a solids content of 15 to 70% by weight. The hydrolysis is preferably performed under basic conditions, for example by addition of NaOH, KOH or $NaOCH_3$. The base is generally used in an amount of 1 to 5 mol % per mole of ester units. The hydrolysis is performed at temperatures of 30° C. to 70° C. After the hydrolysis has ended, the solvent is distilled off and the polyvinyl alcohol is obtained as powder. The polyvinyl alcohol can, however, also be obtained as an aqueous solution by gradual addition of water while the solvent is being distilled off.

Ethylenically unsaturated, silane-containing monomers suitable for modification are, for example, ethylenically unsaturated silicon compounds of the general formula $R^1SiR^2_{0-2}(OR^3)_{1-3}$ where is $CH_2=CR^4-(CH_2)_{0-1}$ or $CH_2=CR^4CO_2(CH_2)_{1-3}$, $R^2$ is a $C_1$- to $C_3$ alkyl radical, $C_1$- to $C_3$ alkoxy radical or halogen, preferably Cl or Br, $R^3$ is an unbranched or branched, optionally substituted alkyl radical having 1 to 12 carbon atoms preferably 1 to 3 carbon atoms, or is an acyl radical having 2 to 12 carbon atoms, where $R^3$ may optionally be interrupted by an ether group, and $R^4$ is H or $CH_3$.

Preferred ethylenically unsaturated, silane-containing monomers are γ-acryloyloxy- and γ-methacryloyloxypropyl-tri(alkoxy)silanes, α-methacryloyloxymethyltri(alkoxy)silanes, γ-methacryloyloxypropylmethyldi(alkoxy)silanes; vinylsilanes such as vinylalkyldi(alkoxy)silanes and vinyltri(alkoxy)-silanes, where the alkoxy groups used may be, for example, methoxy, ethoxy, methoxyethylene, ethoxyethylene, methoxypropylene glycol ether and/or ethoxypropylene glycol ether radicals. Examples of preferred silane-containing monomers are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified vinylsilanes.

Most preferred as ethylenically unsaturated, silane-containing monomers are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane, and also mixtures thereof.

Suitable ethylenically unsaturated, silane-containing monomers are also (meth)acrylamides which contain silane groups and are of the general formula $CH_2=CR^5-CO-NR^6-R^7-SiR^8_n-(R^9)_{3-m}$ where n=0 to 4, m=0 to 2, $R^5$ is either H or a methyl group, $R^6$ is H or is an alkyl group having 1 to 5 carbon atoms, $R^7$ is an alkylene group having 1 to 5 carbon atoms or a bivalent organic group in which the carbon chain is interrupted by an oxygen or nitrogen atom, $R^8$ is an alkyl group having 1 to 5 carbon atoms, $R^9$ is an alkoxy group which has 1 to 40 carbon atoms and may be substituted by further heterocycles. In monomers in which 2 or more $R^5$ or $R^9$ groups are present, they may be identical or different.

Examples of such (meth)acrylamidoalkylsilanes are:

3-(meth)acrylamidopropyltrimethoxysilane, 3-(meth)acrylamidopropyltriethoxysilane, 3-(meth)acrylamidopropyltri(b-methoxyethoxy)silane, 2-(meth)acrylamido-2-methylpropyltrimethoxysilane, 2-(meth)acrylamido-2-methylethyl-trimethoxysilane, N-(2-(meth)acrylamidoethyl)amino-propyltrimethoxysilane, 3-(meth)acrylamidopropyltriacetoxysilane, 2-(meth)acrylamidoethyltrimethoxysilane, 1-(meth)acrylaxnidomethyltrimethoxysilane, 3-(meth)acryl-amidopropylmethyldimethoxysilane, 3-(meth)acrylamidopropyldimethylmethoxysilane, 3-(N-methyl(meth)acryl-amido)propyltrimethoxysilane, 3-((meth)acrylamidomethoxy)-3-hydroxypropyltrimethoxysilane, 3-((meth)acrylamidomethoxy)-propyltrimethoxysilane, N,N-dimethyl-N-trimethoxysilylpropyl-3-(meth)acrylamidopropylammonium chloride and N,N-dimethyl- N-trimethoxysilylpropyl-2-(meth)acrylamido-2-methylpropylammonium chloride.

The ethylenically unsaturated, silane-containing monomers are preferably used in an amount of 0.01 to 40% by weight, more preferably 1.0 to 25% by weight, based in each case on the weight of the vinyl alcohol polymer.

To prepare the silane-modified polyvinyl alcohols, the vinyl alcohol polymer is initially charged in solution. The vinyl alcohol polymer is preferably dissolved in water or a water/alcohol mixture. Suitable alcohols are, for example, methanol, ethanol, propanol, isopropanol. The ethylenically unsaturated, silane-containing monomers can all be initially charged or all be metered in, or portions can be initially charged and the remainder metered in after the initiation of the modification. In the case of a relatively low concentration of the silane-containing monomers, preferably up to 20% by weight of silane-containing monomers based on the vinyl alcohol polymer, preference is given to initially charging the total amount of silane-containing monomer and to metering in the initiator, or to initially charging the initiator and to metering in the total amount of silane-containing monomer. In the case of higher monomer concentrations, preferably greater than 20% by weight of silane-containing monomers based on the vinyl alcohol polymer, some of the silane-containing monomers and of the initiator are initially charged and the remainder in each case is metered in. The modification is effected at elevated temperature, i.e. at temperatures of ≧30° C., and is preferably initiated by a free-radical mechanism by adding common initiators. Preference is given to effecting the modification at a temperature of 50° C. to 100° C. The proportion of initiator is preferably 0.1 to 10.0% by weight based on the total amount of silane-containing monomers used. Examples of common initiators are peroxodisulphates such as potassium peroxodisulphate and ammonium peroxodisulphate.

The silane-modified polyvinyl alcohols obtained thereby can be used in solution. The silane-modified polyvinyl alcohols may also be isolated in a known manner by means of precipitation, distillation or drying, for example spray-drying, and used as a solid. It is particularly advantageous that the inventive silane-modified polyvinyl alcohols exhibit high storage stability even at relatively high silane content. While conventional silane-modified polyvinyl alcohols which are obtained by means of copolymerization of ethylenically unsaturated silane with vinyl ester and subsequent hydrolysis tend to gel even at a content of silane-functional comonomer units of 2% by weight, the inventive silane-modified polyvinyl alcohols are storage-stable even in the case of modification with up to 40% by weight of silane-containing monomers.

Advantageously, the silane-modified polyvinyl alcohols are obtainable in colourless form by the process according to the invention. The occurrence of discoloration or yellowing in the course of modification of polyvinyl alcohol polymers with ethylenically unsaturated silane monomers can thus be suppressed. This is achieved by virtue of the inventive selection of the reaction conditions, especially by virtue of use of the inventive reaction temperatures and, if appropriate, by use of inventive amounts of initiators.

The silane-modified polyvinyl alcohols are suitable for use in the fields of application typical of polyvinyl alcohols. The silane-modified polyvinyl alcohols are suitable as a binder or cobinder for coating compositions and adhesive compositions. The silane-modified polyvinyl alcohols are particularly suitable as binders in paper coatings, especially for inkjet papers. The silane-modified polyvinyl alcohols are also suitable as protective colloids, for example for aqueous dispersions and in the case of reaction in aqueous medium, and in the production of dispersion powders redispersible in water. Further fields of use are the treatment of pigments and fillers and use as binders in the ceramics industry. Further uses are in cosmetics, especially hair cosmetics, and as binders in food packaging and the textile industry.

EXAMPLE 1

A thermostatted laboratory apparatus of capacity 2.5 litres was initially charged under nitrogen with 1000 g of a 20% aqueous polyvinyl alcohol solution (Mowiol 8-88, from Kuraray Specialities Europe) and heated to 90° C. with stirring. The solution was stirred at this temperature for 2 h and then the temperature was reduced to 80° C. and 15 g of vinyltriethoxysilane (Geniosil GF 56, from Wacker Chemie) were added to the polyvinyl alcohol solution. After homogenizing for 15 min, the reaction was initiated by the addition of 10 g of a 3% aqueous potassium peroxodisulphate solution. The temperature was kept at 80° C. for 4 h and then the mixture was cooled. A clear polymer solution was obtained with a solids content of 21% by weight and with a silane content of 7.0% by weight based on the total weight of the silane-modified polyvinyl alcohols.

EXAMPLE 2

A thermostatted laboratory apparatus of capacity 2.5 litres was initially charged under nitrogen with 1000 g of a 20% aqueous polyvinyl alcohol solution (Mowiol 8-88, from Kuraray Specialities Europe) and heated to 90° C. with stirring. The solution was stirred at this temperature for 2 h and then the temperature was reduced to 80° C. and 36 g of vinyltriethoxysilane (Geniosil GF 56, from Wacker Chemie) were added to the polyvinyl alcohol solution. After homogenizing for 15 min, the reaction was initiated by the addition of 30 g of a 3% aqueous potassium peroxodisulphate solution (metering time 20 min). The temperature was kept at 80° C. for 4 h and then the mixture was cooled. A clear polymer solution was obtained with a solids content of 22% by weight and with a silane content of 15.0% by weight based on the total weight of the silane-modified polyvinyl alcohols.

EXAMPLE 3

A thermostatted laboratory apparatus of capacity 2.5 litres was initially charged under nitrogen with 1000 g of a 20% aqueous polyvinyl alcohol solution (Mowiol 8-88, from Kuraray Specialities Europe) and heated to 90° C. with stirring. The solution was stirred at this temperature for 2 h and then the temperature was reduced to 80° C. and 51 g of vinyltriethoxysilane (Geniosil GF 56, from Wacker Chemie) were added to the polyvinyl alcohol solution. After homogenizing for 15 min, the reaction was initiated by the addition of 40 g of a 3% aqueous potassium peroxodisulphate solution (metering time 30 min). The temperature was kept at 80° C. for 4 h and then the mixture was cooled. A slightly opaque polymer solution was obtained with a solids content of 23% by weight and with a silane content of 20.0% by weight based on the total weight of the silane-modified polyvinyl alcohols.

EXAMPLE 4

A thermostatted laboratory apparatus of capacity 2.5 litres was initially charged under nitrogen with 1000 g of a 20% aqueous polyvinyl alcohol solution (Mowiol 8-88, from Kuraray Specialities Europe) and heated to 90° C. with stirring. The solution was stirred at this temperature for 2 h and then the temperature was reduced to 80° C., and 15 g of vinyltriethoxysilane (Geniosil GF 56, from Wacker Chemie) were added to the polyvinyl alcohol solution. After homogenizing for 15 min, the reaction was initiated by adding 10 g of a 3% aqueous potassium peroxodisulphate solution. The temperature was kept at 80° C. for 4 h and then the temperature was reduced to 40° C. and the pH was adjusted to 9 with ammonia and the mixture was stirred for 2 hours. After cooling, the pH was adjusted to 5 with hydrochloric acid. A clear polymer solution was obtained with a solids content of 20% by weight and with a silane content of 7.0% by weight, based on the total weight of the silane-modified polyvinyl alcohols.

COMPARATIVE EXAMPLE 5

Initial Charge 8.4 g of vinyltriethoxysilane
1.192 g of vinyl acetate
240 g of methanol
0.35 g of tert-butylperoxypivalate (75% pure)

The initial charge was heated under nitrogen and with stirring (95 rpm) and polymerized under reflux (57° C.-60° C.). 60 min and 120 min after reflux, 0.64 g in each case of tert-butyl peroxypivalate was added. 180 min after reflux, 400 g of methanol were added to the reactor and the mixture was stirred under reflux for a further 4 hours and then the polymer solution was cooled.

The resulting resin solutions were hydrolysed to the polyvinyl alcohol by the following procedure:

87 g of methanol were blanketed over 1280 g of a resin solution adjusted to solids content 34% by weight. Then, after addition of 96 g of a 4.5% strength methanolic NaOH solution, stirring (200 rpm) was commenced at 30° C. After 120 minutes, the hydrolysis was terminated with ethyl acetate (adjustment to pH 7).

The precipitated vinyl alcohol copolymer was filtered off, washed with methanol and dried. The resulting silane-modified polyvinyl alcohol had a Höppler viscosity of 7.5 mPa·s.

COMPARATIVE EXAMPLE 6

The procedure was analogous to Example 1 with the difference that 126 g of the 3% aqueous potassium peroxodisulphate solution were used.

A highly yellowed polymer solution with a solids content of 17.5% by weight was obtained.

Testing of silane-modified polyvinyl alcohols in inkjet recording layers:

| Coating slip formulation: | |
| --- | --- |
| Precipitated silica | 100 parts by weight |
| Si-PVAL from Example 1 | 28 parts by weight |
| Cationic dispersant | 5 parts by weight |
| Polymer dispersion | 12 parts by weight |

Solids content of the coating slip: 30% by weight

Untreated Paper:

Sized paper approx. 80 g/m²; coating approx. 15 g/m²

Testing:

Abrasion Test:

A 4.5 cm-wide and 19 cm-long paper strip coated with the coating slip was processed at 50 strokes in an abrasion tester from Prüfbau (Dr Dürner system) with black drawing paper applied to a die (500 g). The resulting black paper was then assessed visually, the mark 1 representing the optimum.

Whiteness:

The whiteness was determined by means of reflectance measurement with a filter (R 457) and assessed visually, the mark 1 representing the optimum.

Storage Stability:

The storage stability was tested in each case by storing an 18% aqueous solution of the silane-modified polyvinyl alcohol at a pH of 5 for up to 14 days, and determining the Höppler viscosity (to DIN 53015 as a 4% aqueous solution).

The results are compiled in Table 1.

TABLE 1

| Ex. | Whiteness visual | Whiteness R 457 | Abrasion test | Höppler viscosity after 1 day | Höppler viscosity after 14 days |
| --- | --- | --- | --- | --- | --- |
| Ex. 1 | 1 | 5.3 | 1 | 8.2 | 8.6 |
| Ex. 4 | 1 | 4.9 | 1 | 7.9 | 8.3 |
| C.ex. 5 | 1 | 5.2 | 1 | 7.5 | gelled |

Test in Release Papers:

Production of the Paper:

The primer (solution of the appropriate silane-modified polyvinyl alcohol) was applied to an untreated paper by means of a laboratory sizing press and dried appropriately (coat weight 1.5 g/m² to 3 g/m²). A release layer composed of 100 parts by weight of a vinyl-terminated polysiloxane (Dehesive 920), 2.4 parts by weight of an H-containing siloxane (crosslinker V90) and 1 part by weight of Pt catalyst (catalyst OL) was applied to the paper thus primed, and the coated paper was heat-treated at 150° C. for 7 seconds.

Test Method:

Migration Testing:

A test adhesive tape was applied to the freshly siliconized side and then pulled off again. The adhesive strip was folded together such that the adhesive surfaces touched. The ends were then pulled apart (loop test). When the layers adhering to one another have good adhesion, this suggests good adhesion of the silicone layer on the substrate. The two tests are rated from 1 to 6: 1=very good, 6=very poor.

Ruboff:

The siliconized surface is rubbed vigorously with a finger and this area is viewed in light incident at an oblique angle. When brightness differences or streaks occur in this area, the silicone product is not adhering optimally. In addition, the silicone layer is rubbed hard once again with a finger and the amount of attritus particles is observed. Both tests are rated from 1 to 6.

The results are compiled in Table 2:

TABLE 2

| Examples | Migration | Ruboff |
| --- | --- | --- |
| Ex. 2 | 1 | 1 |
| Ex. 3 | 1 | 2 |
| C.Ex. 5 | 2 | 1 |

The invention claimed is:

1. A process for preparing a silane-modified polyvinyl alcohol, comprising treating at least one vinyl alcohol polymer in aqueous solution with one or more ethylenically unsaturated, silane-containing monomers at a temperature $\geq 30°$ C. in the presence of a free radical initiator.

2. The process of claim 1, wherein the vinyl alcohol polymer comprises a partly or fully hydrolysed vinyl ester polymer having a degree of hydrolysis of 50 mol% to 99.99 mol %.

3. The process of claim 1, wherein the treatment of the vinyl alcohol polymer with one or more ethylenically unsaturated, silane-containing monomers is effected at temperatures between 50° C. and 100° C.

4. The process of claim 1, wherein the proportion of free radical polymerization initiator is 0.1 to 10.0% by weight based on the total amount of silane-containing monomers used.

5. The process of claim 1, wherein the vinyl alcohol polymer has a viscosity of 1 to 60 mPas (DIN 53015, Höppler method; 4% solution in water).

6. The process of claim 1, wherein the one or more ethylenically unsaturated, silane-containing monomers are selected from the group consisting of ethylenically unsaturated silicon compounds of the formula $R^1SiR^2_{0-2}(OR^3)_{1-3}$ where $R^1$ is $CH_2{=}CR^4{-}(CH_2)_{0-1}$ or $CH_2{=}CR^4CO_2(CH_2)_{1-3}$, $R^2$ is a $C_1$- to $C_3$-alkyl radical, $C_1$- to $C_3$-alkoxy radical or halogen, $R^3$ is an unbranched or branched, optionally substituted alkyl radical having 1 to 12 carbon atoms or is an acyl radical having 2 to 12 carbon atoms, where $R^3$ may optionally be interrupted by an ether group, and $R^4$ is H or $CH_3$.

7. The process of claim 1, wherein the one or more ethylenically unsaturated, silane-containing monomers are selected from the group consisting of (meth)acrylamides which contain silane groups and are of the formula $CH_2{=}CR^5{-}CO{-}NR^6{-}R^7{-}SiR^8_n{-}(R^9)_{3-m}$ where n=0 to 4, m=0 to 2, $R^5$ is H or a methyl group, $R^6$ is H or is an alkyl group having 1 to 5 carbon atoms, $R^7$ is an alkylene group having 1 to 5 carbon atoms or a bivalent organic group in which the carbon chain is interrupted by an oxygen or nitrogen atom, $R^8$ is an alkyl group having 1 to 5 carbon atoms, $R^9$ is an alkoxy group which has 1 to 40 carbon atoms and may be substituted by further heterocycles.

8. The process of claim 1, wherein 2.5 to 40% by weight of ethylenically unsaturated, silane-containing monomers, based on the weight of the vinyl alcohol polymer, are used.

* * * * *

UNITED STATES PATENT AND TRADEMARK OFFICE
CERTIFICATE OF CORRECTION

PATENT NO. : 7,723,424 B2  Page 1 of 1
APPLICATION NO. : 12/093505
DATED : May 25, 2010
INVENTOR(S) : Abdulmajid Hashemzadeh et al.

It is certified that error appears in the above-identified patent and that said Letters Patent is hereby corrected as shown below:

Column 10, Line 19, Claim 7:

After "carbon atoms"
Delete "and may be" and insert --optionally--.

Column 10, Line 20, Claim 7:

After "substituted by"
Delete "heterocycles" and insert --heteroatoms--.

Signed and Sealed this

Fifth Day of October, 2010

David J. Kappos
*Director of the United States Patent and Trademark Office*